United States Patent
Tuncer et al.

(10) Patent No.: US 11,237,529 B2
(45) Date of Patent: Feb. 1, 2022

(54) METHOD AND SYSTEM FOR SOFTWARE DEFINED METALLURGY

(71) Applicant: Desktop Metal, Inc., Burlington, MA (US)

(72) Inventors: Nihan Tuncer, Cambridge, MA (US); Brian Kernan, Andover, MA (US); Animesh Bose, Burlington, MA (US); Mark Sowerbutts, Townsend, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 16/224,432

(22) Filed: Dec. 18, 2018

(65) Prior Publication Data

US 2019/0187639 A1 Jun. 20, 2019

Related U.S. Application Data

(62) Division of application No. 15/901,265, filed on Feb. 21, 2018, now Pat. No. 10,191,456.

(Continued)

(51) Int. Cl.
*B33Y 10/00* (2015.01)
*B29C 64/10* (2017.01)
(Continued)

(52) U.S. Cl.
CPC .............. *G05B 15/02* (2013.01); *B22F 3/003* (2013.01); *B22F 3/1007* (2013.01);
(Continued)

(58) Field of Classification Search
CPC ........ G05B 15/02; B22F 3/003; B22F 3/1021; B22F 3/1007; B22F 3/1017; B22F 3/008;
(Continued)

(56) References Cited

U.S. PATENT DOCUMENTS 4,781,358 A * 11/1988 Langan ..................... B22F 3/10
 266/80
6,595,430 B1 * 7/2003 Shah ........................ F24F 11/30
 236/46 R (Continued)

FOREIGN PATENT DOCUMENTS

EP 2330468 A1 6/2011

OTHER PUBLICATIONS

International Search Report and Written Opinion for PCT/US2018/029349 dated Jul. 24, 2018 entitled "Method and System for Software Defined Metallurgy".

*Primary Examiner* — Nahida Sultana
(74) *Attorney, Agent, or Firm* — Oak Law, PLLC; Jonathan D. Hall

(57) ABSTRACT

A system for generating a user-adjustable furnace profile, comprises a user interface configured to receive one or more materials properties from a user, a processor, and a memory with computer code instructions stored thereon. The memory is operatively coupled to the processor such that, when executed by the processor, the computer code instructions cause the system to implement communicating with a furnace to ascertain one or more thermal processes associated with the furnace, identifying one or more object characteristics associated with an object to be processed by furnace, and determining a thermal processing parameter profile of at least one thermal processing parameter corresponding to each of the thermal processes, based on (i) the one or more part characteristics and (ii) the one or more materials properties, the thermal processing parameter profile characterizing a cycle of the one or more thermal processes.

13 Claims, 10 Drawing Sheets

Related U.S. Application Data

(60) Provisional application No. 62/492,744, filed on May 1, 2017.

(51) Int. Cl.
| | |
|---|---|
| *G05B 15/02* | (2006.01) |
| *B22F 3/10* | (2006.01) |
| *G06F 3/0484* | (2013.01) |
| *B33Y 30/00* | (2015.01) |
| *B33Y 50/02* | (2015.01) |
| *G06F 3/0482* | (2013.01) |
| *B22F 3/00* | (2021.01) |
| *F27D 19/00* | (2006.01) |
| *F27D 21/00* | (2006.01) |
| *B33Y 40/00* | (2020.01) |
| *B22F 3/24* | (2006.01) |
| *B22F 10/10* | (2021.01) |
| *G05B 13/04* | (2006.01) |

(52) U.S. Cl.
CPC .......... *B22F 3/1017* (2013.01); *B22F 3/1021* (2013.01); *B22F 3/24* (2013.01); *B22F 10/10* (2021.01); *B33Y 10/00* (2014.12); *B33Y 30/00* (2014.12); *B33Y 40/00* (2014.12); *B33Y 50/02* (2014.12); *F27D 19/00* (2013.01); *F27D 21/00* (2013.01); *G06F 3/0482* (2013.01); *G06F 3/04847* (2013.01); *B22F 2203/11* (2013.01); *F27D 2019/0003* (2013.01); *F27D 2019/0096* (2013.01); *G05B 13/042* (2013.01)

(58) Field of Classification Search
CPC ..... B22F 2203/11; B33Y 30/00; B33Y 50/02; B33Y 10/00; F27D 21/00; F27D 19/00; F27D 2019/0096; F27D 2019/0003; G06F 3/04847; G06F 3/0482
See application file for complete search history.

(56) References Cited

U.S. PATENT DOCUMENTS

| | | | |
|---|---|---|---|
| 8,934,994 B1* | 1/2015 | Lee | G05B 19/4099 |
| | | | 700/47 |
| 10,191,456 B2* | 1/2019 | Tuncer | G05B 15/02 |
| 10,279,521 B1* | 5/2019 | Pawar | B23K 26/342 |
| 2002/0156542 A1* | 10/2002 | Nandi | G05B 13/042 |
| | | | 700/30 |
| 2010/0140852 A1 | 6/2010 | Kritchman | |
| 2014/0265045 A1* | 9/2014 | Cullen | B29C 64/205 |
| | | | 264/497 |
| 2016/0207263 A1 | 7/2016 | Gordon | |
| 2017/0156347 A1 | 6/2017 | Reese et al. | |
| 2017/0197341 A1* | 7/2017 | Weinick | B33Y 50/02 |
| 2017/0273314 A1 | 9/2017 | Bigott | |
| 2017/0291841 A1 | 10/2017 | Inamura | |
| 2017/0297290 A1 | 10/2017 | Petri | |
| 2017/0356669 A1* | 12/2017 | Gonia | F24D 19/1084 |
| 2018/0141123 A1* | 5/2018 | Revanur | B33Y 50/00 |
| 2018/0147826 A1* | 5/2018 | Inamura | B33Y 10/00 |
| 2018/0164993 A1* | 6/2018 | Zummo | G06F 3/04847 |
| 2018/0188947 A1* | 7/2018 | Bruin-Slot | G06F 3/04886 |
| 2018/0207876 A1 | 7/2018 | Querol | |
| 2018/0297289 A1 | 10/2018 | Barbati | |
| 2018/0304540 A1 | 10/2018 | Tobia | |
| 2018/0314216 A1* | 11/2018 | Tuncer | G05B 15/02 |
| 2019/0324764 A1* | 10/2019 | Zhang | H04L 63/10 |
| 2020/0047252 A1* | 2/2020 | Kritchman | B29C 64/209 |

* cited by examiner

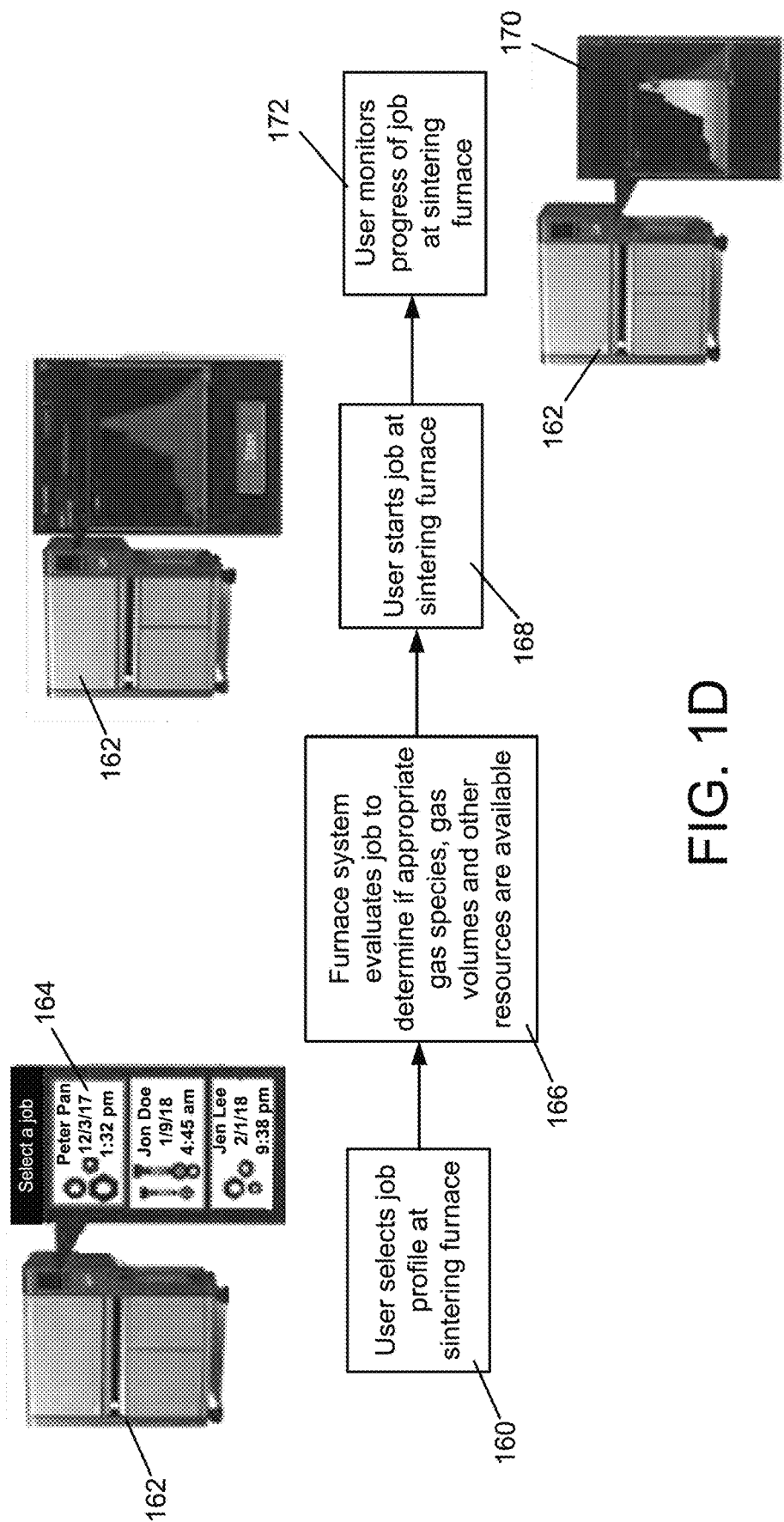

METHOD AND SYSTEM FOR SOFTWARE DEFINED METALLURGY

RELATED APPLICATIONS

This application is a divisional of U.S. application Ser. No. 15/901,265, filed on Feb. 21, 2018, now U.S. Pat. No. 10,191,456, which claims the benefit of U.S. Provisional Application No. 62/492,744, filed on May 1, 2017. The contents of all of the above applications are incorporated herein by reference in their entireties.

BACKGROUND

Additive manufacturing systems generally comprise several processing steps, each of which may be accomplished by a different subsystem. For example, an additive manufacturing system may comprise a printing subsystem, one or more post-processing subsystems and a furnace subsystem. The specific post-processing procedures may vary depending upon the type of printing employed (e.g., extrusion printing, binder jet printing, etc.).

The furnace subsystem may utilize a thermal processing parameter profile that consists of one or more predetermined thermal processing parameter profiles, each of which characterizes an aspect of the processing that occurs in the furnace subsystem.

SUMMARY OF THE INVENTION

The described embodiments may include a variable metallurgy property (VMP) system for generating a user-adjustable thermal processing parameter profile, which may be used by a thermal processing furnace subsystem (also referred to herein as "furnace subsystem") of an additive manufacturing system. As used herein, the terms "thermal process" and "thermal processing" refer to a process that comprises one or both of sintering and heat treatment of a part. The term "part" refers to an article of manufacture, e.g., an object or product.

A user may provide, to the VMP system, one or more desired materials properties (and/or metallurgical characteristics) of a final product to be processed by the furnace subsystem. The VMP system may generate a thermal processing parameter profile for each of one or more thermal processing cycles to be performed on the part, based on the materials properties provided by the user. Each thermal processing parameter profile describes how the furnace must perform an aspect of the thermal process the furnace carries out.

Embodiments of the VMP system may facilitate certain ancillary processing procedures being accomplished during the primary thermal processing cycle. For example, the VMP system may facilitate one or more of annealing, aging, tempering and stress-relieving of a part or parts being processed within the additive manufacturing system.

In one aspect, the invention may be a system for generating a user-adjustable thermal processing parameter profile for use by a furnace. The system may comprise a user interface configured to receive one or more materials properties provided by a user, a processor, and a memory with computer code instructions stored thereon. The memory may be operatively coupled to the processor such that, when executed by the processor, the computer code instructions cause the system to implement communicating with a furnace to ascertain one or more thermal processes associated with the furnace, and identifying one or more part characteristics associated with a part to be processed by the furnace. The computer code instructions may further cause the system to implement determining a thermal processing parameter profile of at least one thermal processing parameter corresponding to each of the thermal processes, based on (i) the one or more part characteristics and (ii) the one or more materials properties, the thermal processing parameter profile characterizing a cycle of the one or more thermal processes.

The materials properties may comprise at least one of (i) hardness, (ii) ductility, (iii) microstructure, (iv) material content, (v) surface property, and (vi) transverse rupture strength. The thermal processing parameter profile may be a function of time. The thermal processing parameter profile may be a function of temperature. The thermal processing parameters may comprise at least one of (i) temperature, (ii) furnace internal atmosphere composition, (iii) chamber pressure, (iv) gas species, (v) gas flow rate, and (vi) furnace load. The materials properties from the user comprise characteristics of a completed part, and the system determines the profile suitable to produce the characteristics of the completed part.

The user interface may be a graphical user interface configured to one or more of (i) receive the one or more materials properties from the user, (ii) present guidance and options concerning subsequent input from the user, and (iii) present feedback to the user concerning each of the thermal processes.

The computer code instructions may further cause the system to communicate with the user through a graphical user interface. Based on the communicating, the computer code instructions may cause the system to one or both of (i) guide the user to an outcome of a cycle of the thermal process and the materials properties of the part and (ii) direct the user to the outcome of a cycle of the thermal process and the materials properties of the part.

The computer code instructions may further cause the system to receive and implement user direction regarding surface modifications to be applied to the part in conjunction with the one or more thermal processes being applied to the part. A first user direction associated with a first part may characterize the one or more thermal processes for the cycle of the one or more thermal processes. The computer code instructions may further cause the system to one or both of (i) notify the user of subsequent user direction that would conflict with the one or more thermal processes corresponding to the first user direction and (ii) prevent the system from implementing changes associated with the subsequent user direction that would conflict with the one or more thermal processes corresponding to the first user direction.

The computer code instructions may further cause the system to receive user input configured to tailor the one or more process parameter profiles according to specific result requirements.

The system may further include a binder trap configured to store binder hydrocarbon products, and a valve that controls a path from the binder trap to the sintering furnace, such that through the valve, the binder hydrocarbon products may be selectively introduced to the sintering furnace to control a carbon potential of the sintering furnace environment.

In another aspect, the invention may be a method of generating a user-adjustable thermal processing parameter profile for use by a furnace. The method may comprise, by a processor and a memory with computer code instructions stored thereon, receiving, through a user interface, one or more materials properties provided by a user. The method may further comprise communicating with a furnace to ascertain one or more thermal processes associated with the furnace, identifying one or more part characteristics associated with a part to be processed by furnace, and determining a thermal processing parameter profile of at least one thermal processing parameter corresponding to each of the thermal processes. The determining may be based on at least one of (i) the one or more part characteristics and (ii) the one or more materials properties. The thermal processing parameter profile may characterize a cycle of the one or more thermal processes.

The method may further comprise communicating with the user through a graphical user interface, Based on the communicating, the method may further comprise one or both of (i) guiding the user to an outcome of a cycle of the thermal process and the materials properties of the part and (ii) directing the user to the outcome of a cycle of the thermal process and the materials properties of the part.

The method may further comprise receiving and implementing user direction regarding surface modifications to be applied to the part in conjunction with the one or more thermal processes being applied to the part. The method may further comprise notifying the user of subsequent user direction that would conflict with the one or more thermal processes corresponding to the first user direction, and preventing the system from implementing changes associated with the subsequent user direction that would conflict with the one or more thermal processes corresponding to the first user direction.

The method may further comprise receiving user input configured to tailor the one or more process parameter profiles according to specific result requirements.

In another aspect, the invention may be a non-transitory computer-readable medium with computer code instruction stored thereon, the computer code instructions, when executed by an a processor, may cause an apparatus to receive, through a user interface, one or more materials properties provided by a user. The computer code instructions may further cause the apparatus to communicate with a furnace to ascertain one or more thermal processes associated with the furnace, to identify one or more object characteristics associated with an object to be processed by furnace, and to determine a thermal processing parameter profile of at least one thermal processing parameter corresponding to each of the thermal processes. The determining of the thermal processing parameter profile may be based on (i) the one or more part characteristics and (ii) the one or more materials properties, the thermal processing parameter profile characterizing a cycle of the one or more thermal processes.

The computer code instructions, when executed by a processor, may further cause the apparatus to communicate with the user through a graphical user interface. Based on the communicating, the computer code instructions may cause the apparatus to one or both of (i) guide the user to an outcome of a cycle of the thermal process and the materials properties of the part and (ii) direct the user to the outcome of a cycle of the thermal process and the materials properties of the part.

The computer code instructions, when executed by an a processor, may further cause the apparatus to receive and implement user direction regarding surface modifications to be applied to the part in conjunction with the one or more thermal processes being applied to the part.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1C and 1D illustrate an example process workflow according to the invention.

DETAILED DESCRIPTION OF THE INVENTION

A description of example embodiments of the invention follows.

Described herein are embodiments of a variable metallurgy property (VMP) system for generating a user-adjustable profile of thermal processing parameters. The VMP may generate, based on metallurgical characteristics and other materials properties provided by the user, a profile for each of one or more thermal processing parameters. The properties may include, for example, microstructures and chemistries (e.g., carbon content), among others described in more detail herein.

In some embodiments, the VMP system may direct the processing system to develop a particular outcome with respect to the resulting process cycle and materials properties, based on a set of parameters provided by the user. The set of parameters may be a part or parts to be processed according to a default set of conditions. The VMP system may permit the user to adjust the default set of conditions to suit the users requirements, then direct the processing system to develop a particular outcome with respect to the resulting process cycle and materials properties, based on the adjusted default conditions.

In some embodiments, the VMP system may facilitate an interactive process setup procedure that guides the user to develop a particular outcome with respect to the resulting process cycle and materials properties.

Figure 1A:
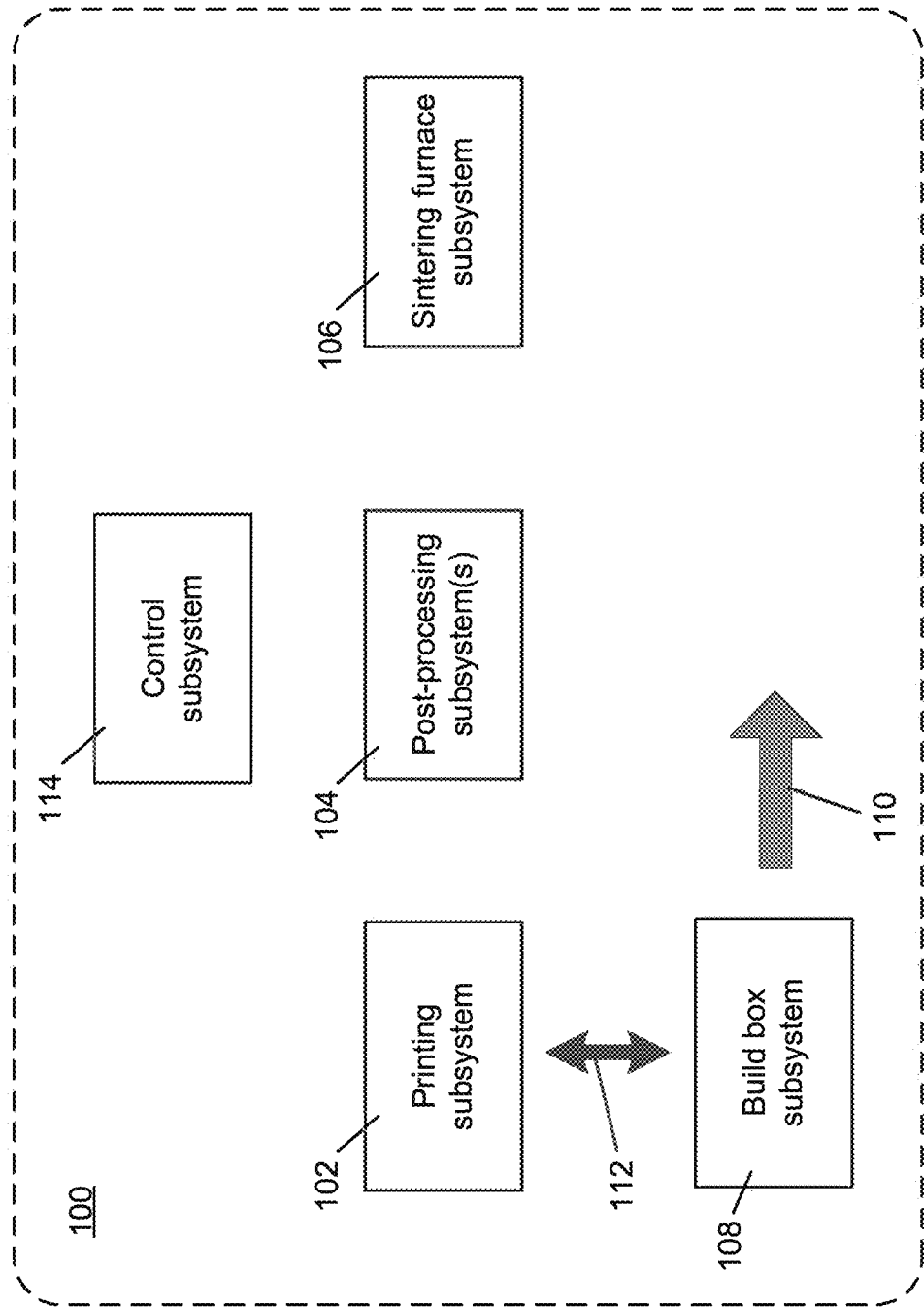
FIG. 1A shows an example manufacturing system that may employ the VMP system.

The VMP system may operate within an additive manufacturing system 100 as shown in FIG. 1A. Such an example additive manufacturing system 100 may include a printing subsystem 102, one or more post-processing subsystems 104 and a furnace subsystem. A build box subsystem 108 may convey 110 one or more objects being fabricated through the fabrication process, communicating 112 with the different subsystems as the object(s) proceed through the fabrication process. It should be understood that although a build box subsystem 108, which is relevant to a binder-jet printing subsystem, is shown in the example system of FIG. 1A, the described embodiments may be used with other types of printer subsystems. It should also be understood that at one or more of the post-processing subsystems 104 and for the furnace subsystem 106, the object(s) being fabricated may be removed from the build box subsystem 108 to accomplish the processing associated with those subsystems. A control subsystem 114 may communicate with each of the subsystems, providing those subsystems with information necessary to accomplish the associated processing steps, and to monitor and control the processing steps.

The thermal processing parameter profiles described herein may define a particular parameter characteristic with respect to another variable, such as time, furnace temperature, atmosphere characteristics, or other relevant variables.

Figure 1B:
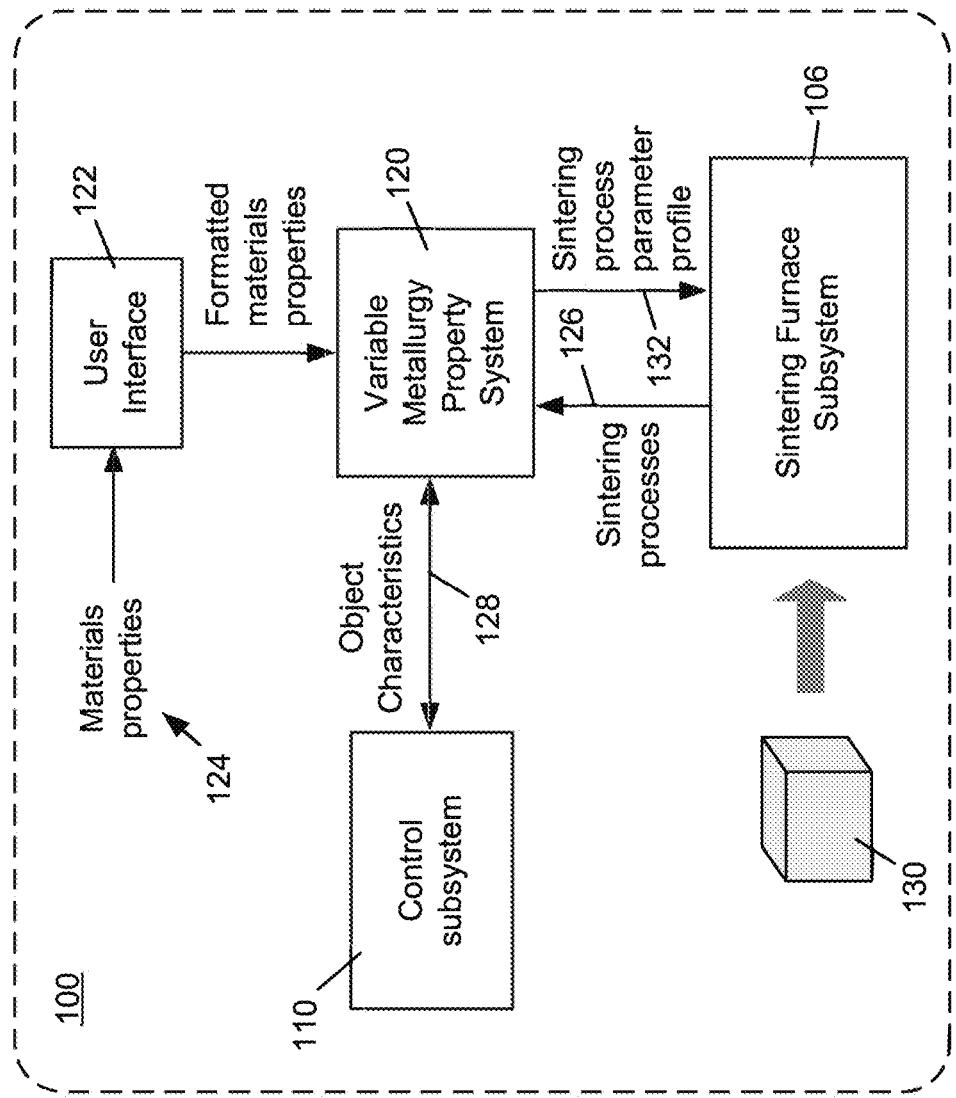
FIG. 1B illustrates an example embodiment of a VMP system according to an aspect of the invention.

FIG. 1B illustrates an example embodiment of a VMP system 120 configured to operate within an additive manufacturing system 100. Although the additive manufacturing comprises the subsystems shown in FIG. 1A, only a subset of the subsystems is shown in FIG. 1B.

A user interface 122 may receive materials properties 206 from the user, and provide the materials properties 124 to the VMP system 120 in a format suitable for the VMP system 120. In other embodiments, the user interface 122 may convey the materials properties 124 to the control system 110, and the control system provides the formatted materials properties to the VMP system 120.

The VMP system 120 may communicate with the furnace subsystem 106 to ascertain one or more thermal processes 126 associated with the furnace 106. The VMP system 120 may identify one or more object characteristics 210 associated with an object 130. The object characteristic(s) 128 may be provided to the VMP system 120 by the control system 110. In other embodiments, the object characteristic(s) 128 may be provided from another source, for example through the user interface 122 or from the build box subsystem 108 from which the object originated.

The VMP system 120 may determine a thermal processing parameter profile 132 corresponding to each of the thermal processes 126, based on the one or more object characteristics 128 and the one or more materials properties 124. The VMP system 120 may provide the thermal processing parameter profile 132 to the furnace subsystem 106.

Figure 1C:
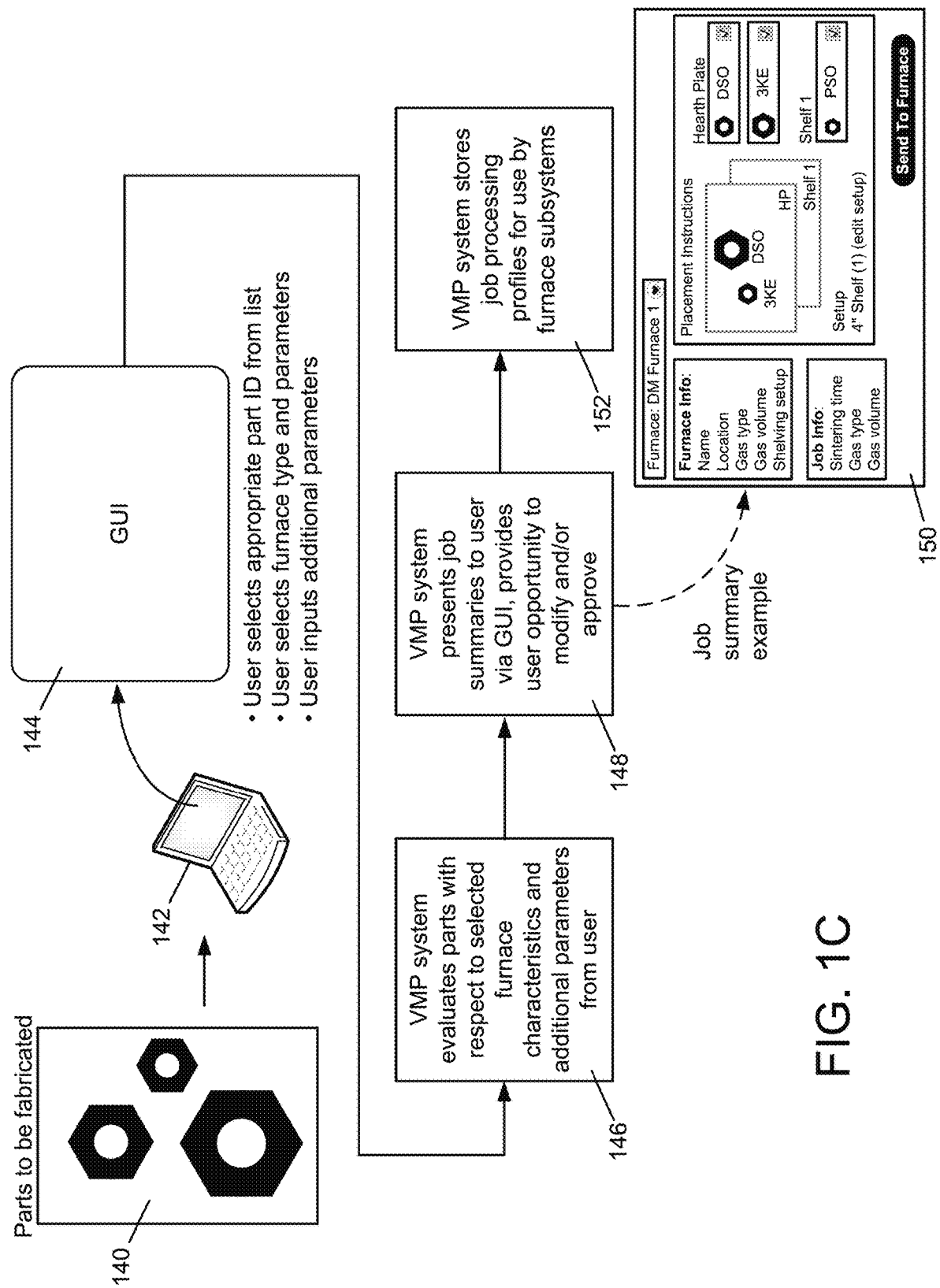

FIGS. 1C and 1D illustrate an example process workflow according to the invention. FIG. 1C depicts the processing job setup workflow, and FIG. 1D depicts the job execution workflow.

FIG. 1C, which depicts the job execution workflow, begins with the user determining which part or parts 140 are to be fabricated. The user, employing VMP system-associated software running on a computing device 142 (e.g., general purpose desktop or laptop computer or workstation) carries out the job setup procedure. Through a graphical user interface (GUI) 144 instantiated on the computing device 142, the user selects one or more appropriate part IDs corresponding to the part(s) 140. The user further selects the furnace type and other furnace parameters through the GUI 144, and any other parameters associated with the part(s) processing cycle.

The VMP system evaluates 146 the part(s) with respect to the selected furnace characteristics and the other characteristics provided by the user. The VMP system may evaluate, for example, the total part(s) mass for the job based on part-related information stored in a database associated with the VMP system, to determine certain processing parameters required and whether or not the furnace is capable of performing the desired processing cycle. As part of this evaluation, the VMP system may request additional information from the user, either through data entry fields or through a menu of suggested choices.

Once the VMP system has generated a processing profile, the VMP system presents 148 a job summary 150 to the user through the GUI 144 of the computing device 142 or other presentation facility associated with the VMP system. The VMP system may provide the user with an opportunity to modify and/or approve the processing job. Once the user is satisfied with the job summary, the VMP system may store 152 the corresponding job processing profile in a database or other storage system that is available to the furnace subsystems.

FIG. 1D, which depicts the job execution workflow, begins with the user selecting 160, at the furnace subsystem 162, a processing job 164 that was created in the procedure of FIG. 1C. Once a processing job 164 is selected, the furnace subsystem 162 may evaluate 166 the processing profile associated with the processing job 164 to determine if appropriate gas species, gas volumes, and other resources are available. For example, the furnace subsystem 162 may determine if tanks containing gas species appropriate for the processing job 164 are connected to the furnace subsystem 162. If such tanks are not connected, the furnace subsystem 162 may prompt the user to acquire and connect appropriate resources.

As another example, the furnace subsystem 162 may determine if enough of the required gas species is available to complete the processing job 164. If sufficient quantities of the gas are not available, the furnace subsystem 162 may prompt the user to ensure that sufficient quantities of the gas species are available. For example, the furnace subsystem 162 may inform the user that the user must hot-swap gas reservoirs before the gas runs out, otherwise the furnace will go into "hold" at 200° below peak temperature. The furnace subsystem may 162 inform the user that a countdown will be presented during which the hot-swap must be performed, otherwise the furnace subsystem 162 may end the processing job. Once such notifications have been presented, the furnace subsystem 162 may prompt the user for an instruction to proceed.

The user may then start 168 the processing job 164 at the furnace subsystem 162. The furnace subsystem 162 may then begin executing the processing job, while providing the user with processing status information 170 so that the user may monitor 172 the job status. The processing status information 170 may be a graphically-based function of time, as shown in FIG. 1D, or it may be textual readout in tabular or other suitable form, or combinations thereof, or other known techniques for presenting such processing status information.

In an example embodiment, an object may be printed from 4140 alloy nominal feedstock steel, using a printing subsystem of an additive manufacturing system. The user of the additive manufacturing system may select, for example, a particular (alloying) element content (e.g., carbon content) of the constituent 4140 alloy steel to be present in the steel after thermal processing. The VMP system may evaluate the desired carbon content input from the user and generates therefrom one or more thermal processing parameter profiles to produce a desired carburization/decarburization effect, and provides the thermal processing parameter profile(s) to the thermal processing furnace subsystem. In one example embodiment, a thermal processing parameter profile may comprise controlling one or more of (i) the gas flow rate, (ii) gas species and (iii) chamber pressure, within the furnace subsystem. As used herein, the "chamber pressure" refers to the internal atmosphere pressure within the processing chamber of the furnace subsystem.

The specific carbon content control technique to be manipulated by the VMP system may depend on the type of furnace being employed. For example, in a graphite chamber with insulation, the VMP system may control carbon content by varying one or more of gas flow rate, chamber pressure, and furnace load. For a tube furnace, in the absence of a carbon source, the VMP system may control carbon content of the part being processed by varying a methane ($CH_4$) gas flow upon cooling.

Adjusting the carbon content of the 4140 alloy steel may produce a very wide range of ductility and/or hardness to the user for alloy steels. In one embodiment, the user may provide ductility and/or hardness as a desired property, the VMP system determines the required carbon content to achieve the desired ductility and/or hardness, and the VMP system produces a thermal processing parameter profile to the furnace subsystem that produces the determined carbon content of the printed object(s).

The carbon content of the printed object can be altered by furnace load (i.e., the total mass and/or cross-sectional thickness of parts placed in the furnace) as well as gas flow rate, chamber pressure and/or gas species to allow a predefined carbon potential atmosphere to be maintained in the workspace. A carbon potential probe would interface with the software to adjust gas flows and other process parameters to maintain the desired carbon potential. This is due to the effect of binder amount on carburizing potential of thermal process. Furnace load and gas flow rate, chamber pressure and/or gas species are thus example thermal processing parameters that the VMP system may determine and provide to the furnace subsystem to adjust the final microstructure, while keeping all the other profiles of furnace parameters (e.g., temperature, time, etc.) constant.

In an alternative embodiment, the carbon potential may be controlled by storing carbon-containing binder products (e.g., products (hydrocarbons) resulting from thermal de-binding), such that the binder products can be released later in the sinter cycle to add carbon potential to the local atmosphere. The binder hydrocarbon products may be stored in a binder trap associated with the sintering furnace. A valve that controls a path from the binder trap to the sintering furnace may be opened to expose the de-binding products to the sintering furnace atmosphere. In some embodiments, the de-binding products may be heated to encourage the contribution of the de-binding product to the carbon potential of the sintering furnace atmosphere.

This use of the de-binding product may allow an increase of the carbon potential without relying solely on the introduction of a carburizing process gas. Further, desired carbon potentials may not be achievable with an explosion-proof methane mixture of process gas, so de-binding product may be used in conjunction with such a methane mixture of process gas (or other such explosion-proof mixtures) to boost the carbon potential to required levels.

For the production of certain high carbon tool steels, there is a trade-off between densification and carbon content, such that the process cannot achieve both high densification and high carbon content with a given set of parameters. In one embodiment, a part may be densified first, at the expense of decarburizing the part, and then the de-binding hydrocarbon products may be used as a carburizing agent in a post-sintering carburizing heat treatment.

In an example embodiment, the VMP system may provide furnace load recommendations to the furnace user, so that the user can manually adjust the furnace load. In other embodiments, the furnace subsystem may automatically adjust the furnace load based on a furnace load parameter profile communicated to it by the VMP system.

In an example embodiment, the user may select (e.g., thorough a user interface to the system) particular parts to be processed, and the VMP system may determine the total mass and/or cross-sectional thickness of objects to be sintered in in a particular thermal processing run, based on the user selections, along with specified material properties and/or desired microstructure. The VMP system may then determine, based on the entered total mass and/or cross-sectional thickness of the objects and desired microstructure for a particular production run, the gas flow rate, chamber pressure and/or gas species needed to achieve that microstructure in that particular production additive manufacturing run.

In some embodiments, the user interface may, in addition to a selection of one or more particular parts, as described above, comprise one or more advanced menu selections for providing additional levels of detail to the metallurgical processing. One example menu is presented below. In an embodiment, a user may access this example menu by selecting an "ADVANCED 1" button image on the user interface, although other selection facilities may be used:
1—fine pearlite+ferrite
2—coarse pearlite+ferrite
3—full bainite
4—bainite+ferrite
5—bainite+pearlite+ferrite
6—martensite
6—martensite+pearlite The user may select a subsequent menu, as presented in the example below, which provides the user with selections of additional processing parameters:
1—Hardness
2—Case hardened
3—Ductility
4—TRS (Transverse Rupture Strength)

Selection of one of the above-referenced subsequent menu items may prompt the user for additional information. For example, if the user selects 1, hardness, the user may be presented with a coarse set of choices, e.g., "hard," "medium," and "soft." Alternatively, the user may be presented with a range of symbols (e.g., numbers), where one end of the range is designated as "hardest" and the other end of the range is designated as "softest." In some embodiments, the user may be presented with an input field, and prompted to enter a number within a hardness range.

As another example, if the user selects "2—Case hardened" from the subsequent menu, the user may be presented with a "yes/no" choice. If the user selects "yes," the user may be presented with the following example choices for submitting additional information:
1—Case depth
2—Case hardness
3—Core hardness In some embodiments, the VMP system may accept a transverse rupture strength (TRS) input from the user.

Figure 2A:
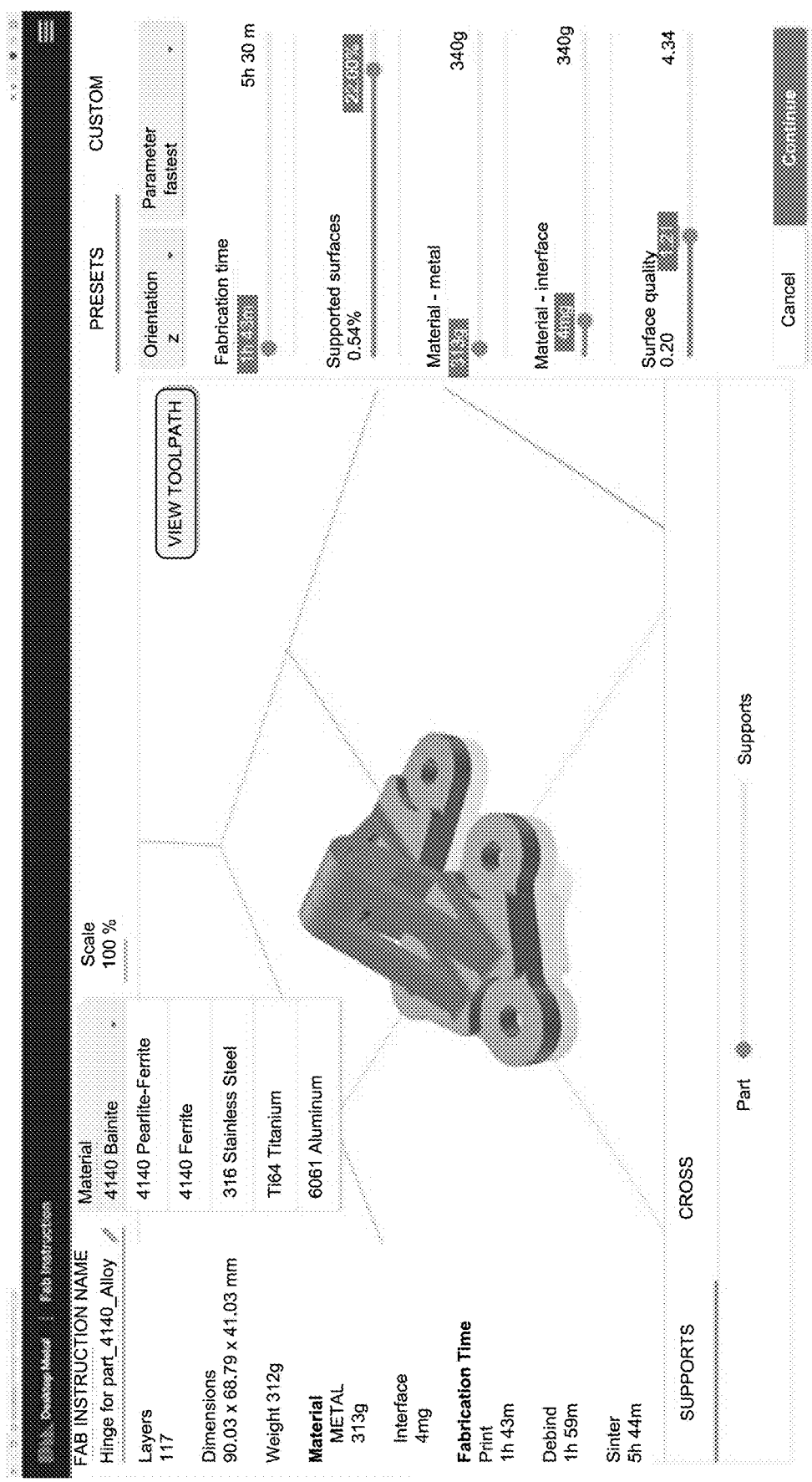
FIG. 2A shows an example user interface according to an aspect of the invention.

FIG. 2A illustrates an example user interface that depicts a materials selection menu. For this example, the 4140 materials all have the same material content, whether it is Bainite, Pearlite-Ferrite, or Ferrite; the final materials all depend on the treatment within the furnace subsystem. Further, the resulting microstructures are dependent on the cooling control within the furnace subassembly (i.e., how quickly the object is cooled).

In other embodiments, the user interface may comprise one or more various graphical user interface (GUI) controls known in the art that may facilitate a user's selection of a part (or parts) and the user's input of materials properties. For example, the user interface may comprise a GUI showing one or more slide controls that each traverses a range of a materials property (e.g., a range of carbon content) such that the user manipulates the slide control to select a particular materials property value. The VMP system modifies the fabrication recipe to produce the selected result.

As another example, the GUI may show a two-dimensional space defined by a pair of orthogonal axes (i.e., an X axis and a Y axis), each axis representing a range of a material property. The user identifies two parameters (e.g., a first key characteristic and a second key characteristic) by selecting a point within the area, and the VMP system modifies the fabrication recipe to produce a result that corresponds to the selected parameters. Alternatively, the GUI may provide for user entry of parameters through a three-dimensional space defined by three orthogonal axes, or a set of two or more such two or three dimensional spaces.

The VMP system may produce process parameter profiles as a function of the input materials properties, based on a fixed mapping. In such cases, the VMP system may employ a look-up table (LUT), implemented in local memory, to accomplish the mapping. The contents of the LUT may be generated empirically, based on part analysis feedback data from test process runs or actual production process runs. The contents of the LUT may alternatively be generated analytically according to formulae based on established materials theory.

Alternatively, the VMP system may produce the process parameter profiles analytically, in real-time or near real-time, by a processor executing instruction code that evaluates the input materials properties according to formulae based on established materials theory. In some embodiments, the VMP system may produce the thermal processing parameter profiles according to a combination of LUT implementation and real-time/near real time analytical processing.

The VMP system may include a "Super User Mode," which allows a user to tailor a process parameter profile according to specific result requirements. The VMP system may evaluate the tailored parameter profile to determine if the resulting parameter combination represents an impossible scenario or represents a parameter combination that could pose a hardware failure, a failure of the material being processed, or both.

The VMP system may unconditionally preclude certain such tailored parameter profiles, for example when the associated parameters would lead to an impossible scenario or hardware failure. The VMP may notify the user that the precluded parameter profile will not be run, and may provide the user with reasons and/or justification for the preclusion.

In some cases, for example when the tailored parameter profile may lead to material failure, the VMP system may conditionally preclude the profile. In such cases, the user may be notified of the conditional preclusion, and may be given an override option. The VMP system may also provide the user with a rationale for the conditional preclusion, with which the user may use to guide a potential override decision.

Other process parameters (or parameter profiles) may additionally (or alternatively) be provided in a profile to the furnace subsystem. For example, the oxygen content in the gas flow may be varied for processing titanium-based alloys to provide variations in hardness vs. ductility of the object material. In this case, the $PaO_2$ (equilibrium oxygen partial pressure) is monitored by the VMP system rather than carbon potential. The VMP system may receive processing data from sensors associated with the furnace (e.g., carbon potential probe, or oxygen probe), to monitor processing conditions during the processing run with respect to the active parameter profile.

An example VMP system may provide thermal processing parameter profiles to produce hardening oxide and/or nitride layers on a material such as titanium or aluminum. Anodized aluminum is just a thick layer of aluminum oxide or aluminum nitride. For example, the VMP system may facilitate a carbo-nitride processing of a part or parts by formulating a process to add a specific gas (e.g., $CH_4+NH_3$) applied to the part(s) at an ideal temperature.

The internal structure of the sintering furnace may comprise one of several different types, or combinations thereof. For example, the sintering furnace internal structure may comprise (i) graphite retort, (ii) carbon retort, (iii) refractory metal retort, or (iv) ceramic retort, among others, or combinations thereof. The use of a carbon, refractory metal or ceramic retort may be used for processing reactive metals such as aluminum and titanium, which cannot be processed in a graphite retort in addition to tightly controlling oxygen in the sintering environment. Nesting a refractory metal or ceramic retort into the graphite retort makes it possible to process reactive metals in the same furnace equipment that would otherwise be used for processing non-reactive metals.

An example VMP system may provide thermal processing parameter profiles to the thermal processing furnace subsystem that define a particular cool-down rate. For example, one cool down rate may be defined for banite, and a slower cool down rate may be defined for ferrite+pearlite. A user would thus provide materials properties input of either "banite" or "ferrite+pearlite" using an input technique described herein, and the VMP system would generate process parameter profiles to the furnace that specify the appropriate cool down rate.

Figure 2B:
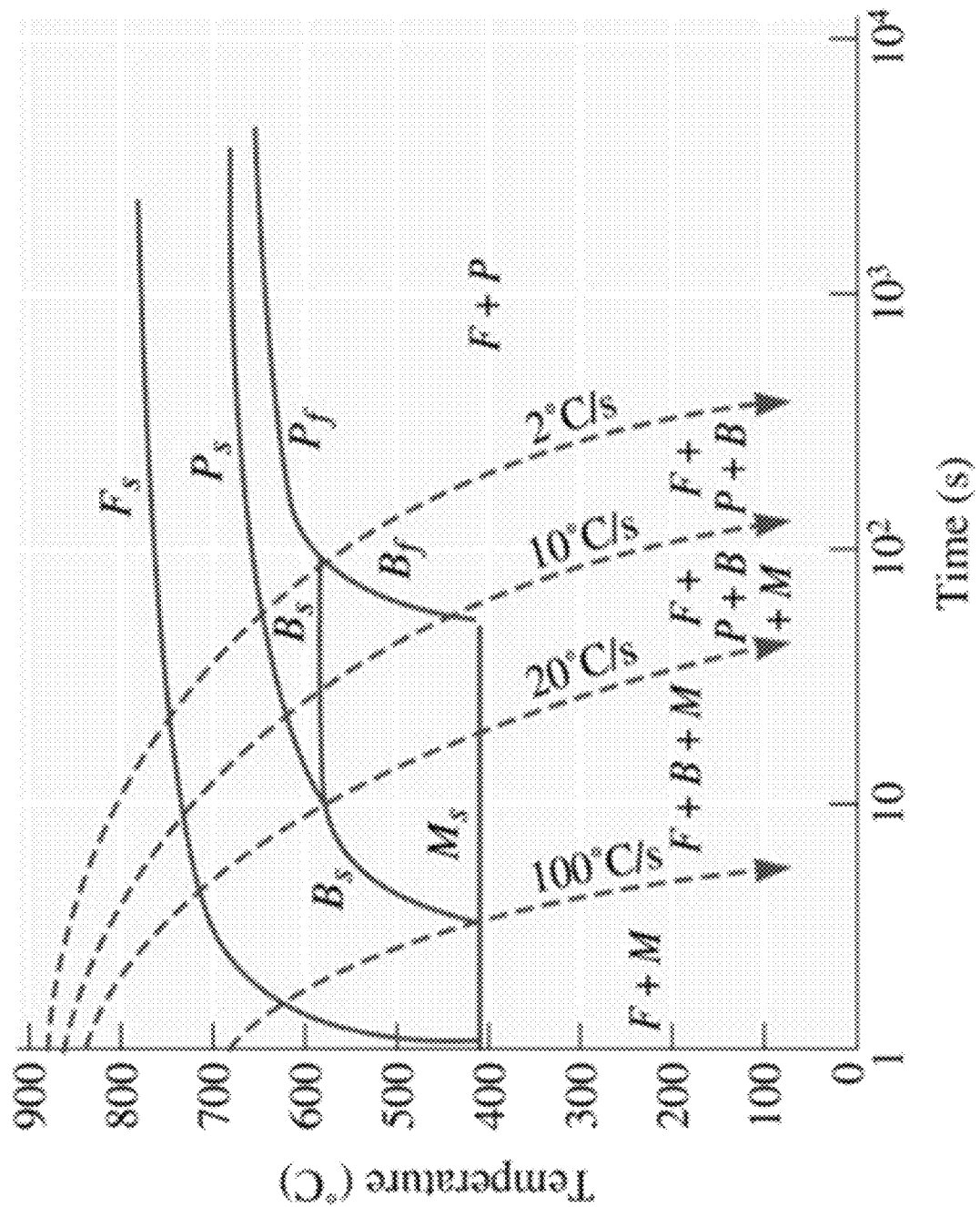
FIG. 2B shows an example CCT diagram according to an aspect of the invention.

The VMP system may present a continuous cooling transformation (CCT) diagram to the user, depicting various transformation products for different cooling rates. In one embodiment, the CCT diagram may depict a cooling curve and resulting transformation products for parameters input by the user. In another embodiment, user may select a particular cooling rate curve on the CCT diagram, through the GUI, in order to specify a desired product result. FIG. 2B shows an example CCT diagram that the VMP system may present to the user. In FIG. 2B, "F" denotes ferrite, "P" denotes pearlite, "B" denotes Bainite, and "M" denotes martensite. The "s" subscript denotes start temperature and the "f" subscript denotes final temperature.

An example VMP system may provide thermal processing parameter profiles to the thermal processing furnace subsystem that adjust thermal processing parameters such as the internal furnace atmosphere, vacuum level and the furnace loading, to selectively harden/carburize the parts. Certain parts may only require a selected region to be hardened (e.g., the teeth of a gear), but require other regions of the part maintain ductility (e.g., thin sections that are prone to embrittlement when too hard/carburized). Embodiments of the print subsystem may print a thin barrier layer (also referred to as a stop-off layer) on selected surfaces to prevent carburization of those selected surfaces, resulting in selective carburizing.

For some embodiments, the dominating factor in final carbon content may be incomplete de-binding. In such an embodiment, the sections under the thin stop-off may pick up carbon due to prolonged exposure to carbon from the binder and become harder selectively. Thus selectively distributing the stop-off may facilitate the thermal processing of functionally gradient steel. Similar techniques of distributing stop-off material may alternatively be used for oxygen hardening of titanium to facilitate the thermal processing of functionally gradient titanium. Similar techniques may apply to other processes, for example for processing titanium with oxygen hardening.

Figure 3A:
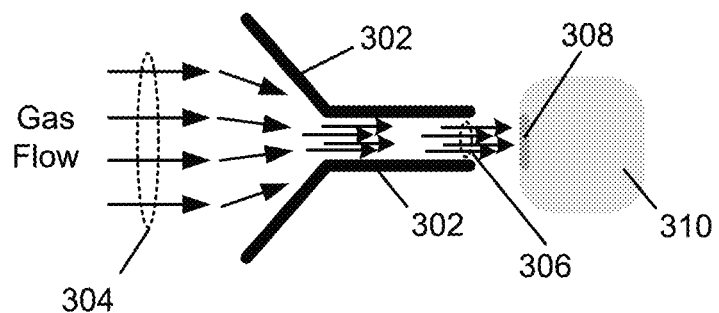
FIGS. 3A and 3B show example gas flow channeling architectures according to an aspect of the invention.
Figure 3B:
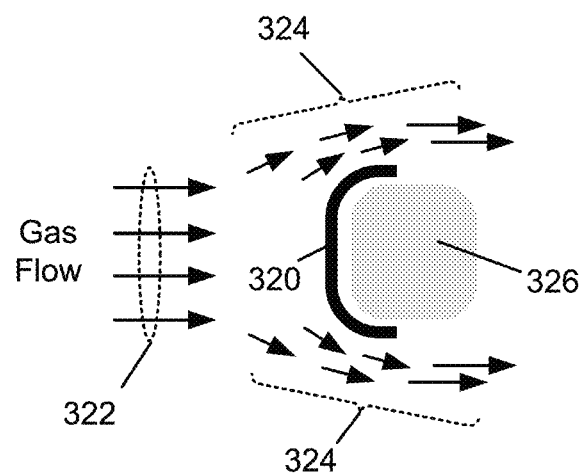

Since certain final material properties may be dependent on how the material is exposed to gas flow during processing, the VMP system may determine gas deflection characteristics needed to produce a particular metallurgical outcome regarding properties of the material. Accordingly, the VMP system may direct certain gas channeling structures to be printed on the part, in the vicinity of the part, or both. FIGS. 3A and 3B illustrate examples of two such channeling architectures.

FIG. 3A illustrates a focusing structure 302, which collects a gas flow 304 and channels the gas flow 304 into a focused gas flow 306, directed to a particular region 308 of part 310 being processed.

FIG. 3B illustrates a deflection structure 320, which deflects and channels a gas flow 322 into a deflected gas flow 324, directed around a part 326 being processed.

FIGS. 3A and 3B are intended to provide examples types of gas flow channeling that may be used to control material properties during processing, and are not intended to be limiting. Other such channeling structures may be used alternatively or in addition to those described in FIGS. 3A and 3B.

Software controlled vacuum levels, at specific thermal zones, may be used to produce a controlled surface enrichment of liquid phase-based materials, for example tungsten carbide and cobalt (WC+Co), tungsten carbide and nickel (WC+Ni), and titanium carbide and Nickel (TiC+Ni). Such a software-controlled process may facilitate enhanced secondary operations such as brazing, or application of surface coatings to the base matrix.

Figure 4A:
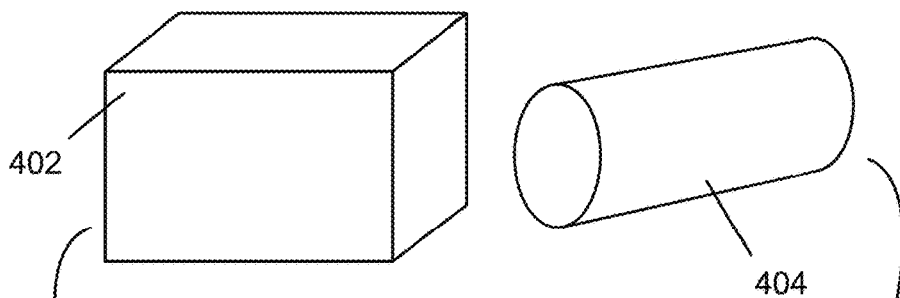
FIGS. 4A, 4B and 4C illustrate examples of objects exposed to reactive gas as an aspect of case-carburization processing according to the invention.
Figure 4B:
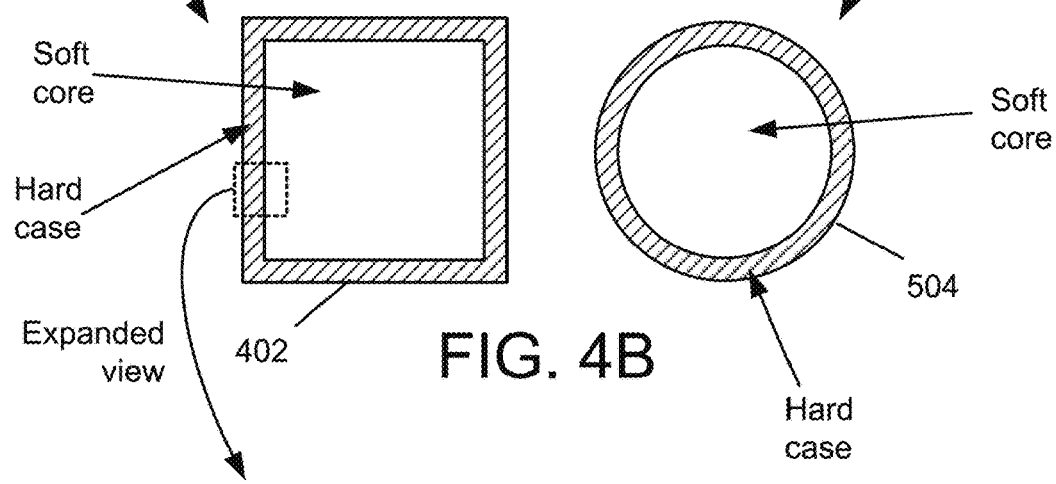
Figure 4C:
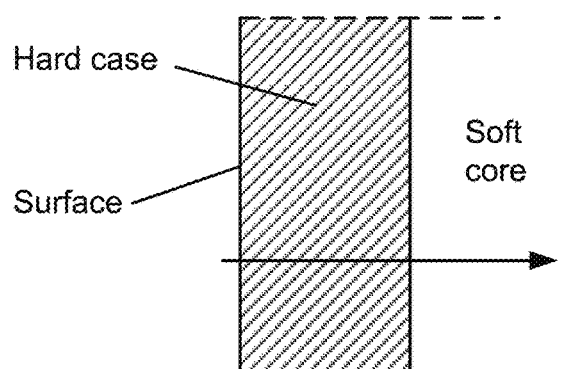
Figure 4C:
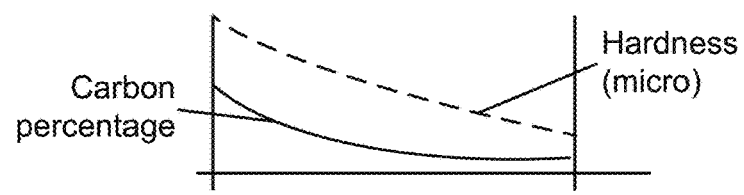

Printed objects, after thermal processing and while cooling, can be exposed to reactive gas species which can be supplied through a hot-swap gas cylinders. For example, these reactive gasses can provide a case-carburization which will yield a carbon content gradient from part surface to center. Two example objects 402, 404, which have been so exposed to reactive gas, are shown in FIG. 4A. If the example objects 402, 404 are cross-sectioned, as shown in FIGS. 4B and 4C, the inner core will be still soft, ductile with high toughness. The outer layer is known as the case, which gives a harder and wear resistant surface. The processing can be such that the outer surface has a high corrosion resistance. The depth of this case-carburized layer or carbonstricted layer can be made to vary and may be controlled by a software based processing system or other control technique. FIG. 4C illustrates carbon percentage (bottom trace and left side of graph) and hardness (top trace and right side of graph) across the cross-sectional view. As can be seen, the carbon percentage and hardness decrease from the outer portion of the object toward the core portion of the object.

An object may be "decarburized" by implementing the carburization process described above in reverse. Decarburizing an object requires exposing the object to reactive gases such as oxygen or hydrogen. The reactive gases combine with carbon in the object, primarily at the surface of the object to result in a reverse carbon gradient (i.e., carbon content increases with distance from the object surface into the object core.

In some embodiments, decarburizing may be accomplished by changing the H2/H2O ratio in the surface atmosphere. The H2/H2O ratio may be reduced by introducing moisture into the sintering atmosphere (by, for example, spraying water), which will make the sintering atmosphere suitable for decarburizing. Similarly, carburizing, boriding or nitriding gases can be introduced into the sintering atmosphere at critical temperatures to modify the chemistry, or surface chemistry, of the part.

An embodiment may facilitate a user adding surface modifications for parts up-front, either at the setup procedure as described with respect to example embodiment of FIG. 1C, or prior to starting the job as described with respect to the example embodiment of FIG. 1D. Embodiments may require that the first part having a surface modification implemented defines the processing cycle, such that subsequent parts modified (either surface modifications or non-surface modifications) will be conditional on the first part's processing profile. In other words, if a part modification subsequent to the first part modification would conflict with the first part modification, the VMP system may notify the user of the conflict and may preclude such subsequent modifications, so as to prevent the fabrication of defective parts in a scenario that requires multiple parts nested in a build box.

Embodiments of the VMP system may facilitate certain ancillary processing procedures being accomplished during the primary thermal processing cycle. For example, the VMP system may facilitate one or more of annealing, aging, tempering, stress-relieving and spheroidizing (a heat treatment for iron-based alloys to convert the alloys into ductile and machinable alloys) of a part or parts being processed within the additive manufacturing system. This step requires an additional type of austenitizing furnace and a water or oil quenching step after sintering is completed, and before these heat treatments can be done in the sintering furnace. After the sintering cycle is over and the part is completely solid, the part may be austenitized and quenched using another type of furnace and quenching equipment. After austenitizing and quenching is done, the solid part can be put back in the furnace for one or more of the software-programmed heat treatments that are listed above. The type, temperature and the duration of these heat treatments (annealing, aging, tempering, etc.) may be pre-programmed in the software using an algorithm that is a function of at least one of (a) the material, (b) required final hardness/toughness and (c) the thickest section of the part.

Figure 5:
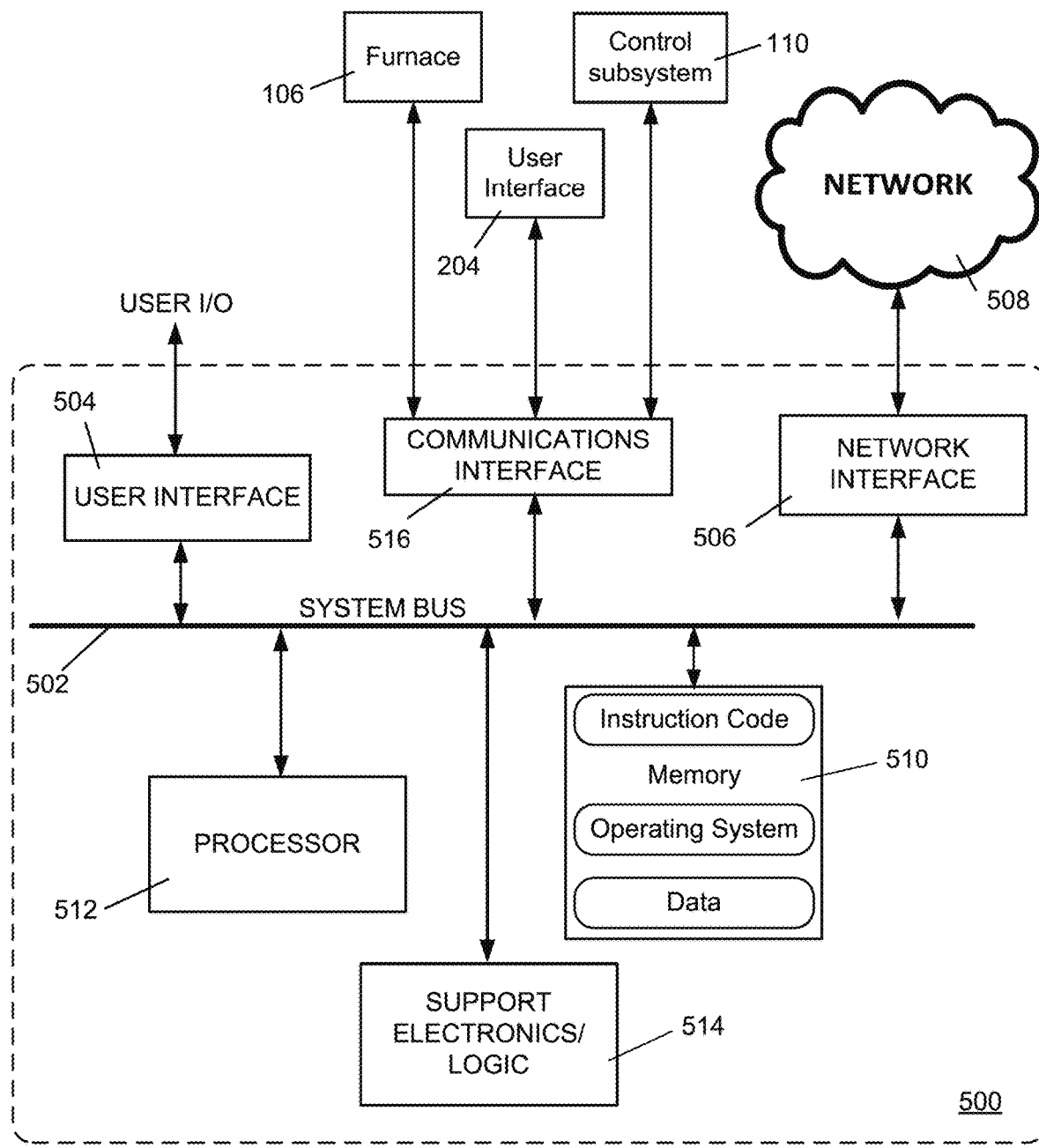
FIG. 5 shows a diagram of an example internal structure of a processing system that may be used to implement one or more of the embodiments herein.

FIG. 5 is a diagram of an example internal structure of a processing system 500 that may be used to implement one or more of the embodiments herein. Each processing system 500 contains a system bus 502, where a bus is a set of hardware lines used for data transfer among the components of a computer or processing system. The system bus 502 is essentially a shared conduit that connects different components of a processing system (e.g., processor, disk storage, memory, input/output ports, network ports, etc.) that enables the transfer of information between the components.

Attached to the system bus 502 is a user I/O device interface 504 for connecting various input and output devices (e.g., keyboard, mouse, displays, printers, speakers, etc.) to the processing system 500. A network interface 506 allows the computer to connect to various other devices attached to a network 508. Memory 510 provides volatile and non-volatile storage for information such as computer software instructions used to implement one or more of the embodiments of the present invention described herein, for data generated internally and for data received from sources external to the processing system 500.

A central processor unit 512 is also attached to the system bus 502 and provides for the execution of computer instructions stored in memory 510. The system may also include support electronics/logic 514, and a communications interface 516. The communications interface 516 may comprise the interface to the user interface 204, the interface to the furnace subsystem 106, or the interface to the control subsystem 110, as described with reference to FIG. 2A.

In one embodiment, the information stored in memory 510 may comprise a computer program product, such that the memory 510 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

Figure 6:
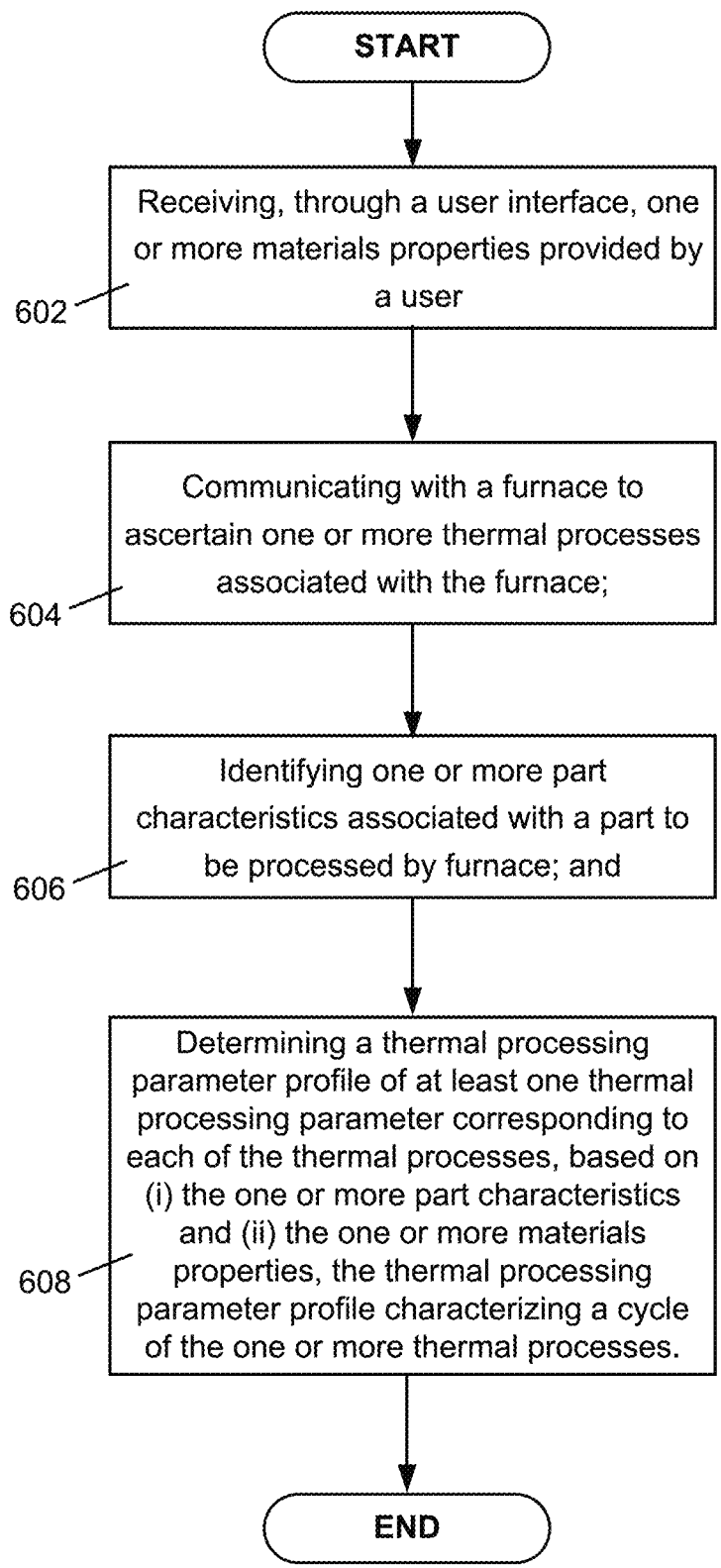
FIG. 6 shows an example embodiment of a method of generating a user-adjustable thermal processing parameter profile for use by a sintering furnace.

One example embodiment of a method of generating a user-adjustable thermal processing parameter profile for use by a sintering furnace is shown in FIG. 6. The method may comprise receiving 602, through a user interface, one or more materials properties provided by a user. The method may further comprise communicating 604 with a furnace to ascertain one or more thermal processes associated with the furnace, and identifying 606 one or more part characteristics associated with a part to be processed by furnace. The process may further comprise determining 608 a thermal processing parameter profile of at least one thermal processing parameter corresponding to each of the thermal processes, based on (i) the one or more part characteristics and (ii) the one or more materials properties, the thermal processing parameter profile characterizing a cycle of the one or more thermal processes.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of controlling, via a control system, a furnace for thermally processing an object, the method comprising:
receiving, via a user interface, one or more material properties of the object in a post-processed state, wherein the post-processed state occurs after the object is formed and before the object is thermally sintered;
receiving from the furnace one or more thermal processes associated with the furnace;
receiving, via the user interface, one or more characteristics of the object in a pre-processed state;
determining a thermal processing profile of the object, wherein the thermal processing profile is based on at least one of the one or more material properties of the object, the one or more characteristics of the object, or the one or more thermal processes; and
determining, based on the thermal processing profile, whether the furnace includes one or more physical components associated with the one or more thermal processes necessary to process the object to achieve the one or more material properties of the object in a post-processed state,
wherein the one or more characteristics of the object includes a characteristic of a first material from which the object is formed and a characteristic of a second material, different from the first material, wherein the second material coats a surface of the object after a thermal process and during a cooling process, and
wherein the thermal processing profile includes instructions to cause the second material to have at least one different material property in the post-processed state than the one more material properties of the object.

2. The method according to claim 1, further comprising: displaying the thermal processing profile on a display; and receiving a user input based on the processing profile.

3. The method according to claim 2, wherein the user input includes one or more of a modification of the processing profile or an approval of the processing profile.

4. The method according to claim 1, wherein the processing profile includes instructions to control the furnace to release one or more of water, boride, or nitrogen into an inner chamber of the furnace during processing of the object.

5. The method according to claim 1, further comprising:
in response to the furnace not including one or more of the physical components necessary to process the object according to the processing profile, generating an indication to a user; and
alerting the user when the one or more physical components associated with the one or more thermal processes are ready to be replaced.

6. The method according to claim 1, wherein the processing profile includes instructions to adjust the one or more thermal processes based on the one or more material properties of the object in the post-processed state.

7. The method according to claim 1, wherein the one or more material properties are received via one or more of a user input to a graphical user interface (GUI) associated with the furnace or a mobile device operably connected to the furnace.

8. The method according to claim 1, further comprising:
prompting a user to input the one or more material properties of the object; and prompting the user to input the one or more characteristics of the object.

9. The method according to claim 1, further comprising: initiating the processing profile to begin processing the object and generating an output to a user indicating a status of the processing.

10. The method according to claim 1, wherein the processing profile includes instructions to control at least one of a gas flow rate, a gas species, or a chamber pressure of the furnace during processing of the object.

11. The method according to claim 1, further comprising:
displaying on a graphical user interface (GUI) representations of a plurality of printed objects printed by an additive manufacturing device;
receiving via the GUI a selection of a first object to be processed from the plurality of printed objects; and
based on the selection of the first object, preventing the GUI from receiving a selection of a second object from the plurality of printed objects to be processed with the selected first object if the selected second object has a processing profile that requires a thermal process not compatible with the processing profile of the selected first object.

12. The method according to claim 1, wherein the thermal processes include one or more of a heating time, a furnace temperature, an atmosphere composition, or a pressure of the furnace.

13. The method according to claim 1, wherein receiving the one or more characteristics of the object includes at least one of receiving an input from a user or receiving an input from an additive manufacturing device used to print the object.

* * * * *